(12) United States Patent
Tong et al.

(10) Patent No.: US 6,603,903 B1
(45) Date of Patent: Aug. 5, 2003

(54) FABRICATION OF PHOTOSENSITIVE STRONG GRATING COUPLERS

(75) Inventors: Xiaolin Tong, Irvine, CA (US); Anthony S. Kewitsch, Santa Monica, CA (US); George A. Rakuljic, Santa Monica, CA (US)

(73) Assignee: Arroyo Optics Inc., Santa Monica, CA (US)

( * ) Notice: Subject to any disclaimer, the term of this patent is extended or adjusted under 35 U.S.C. 154(b) by 224 days.

(21) Appl. No.: 09/799,090

(22) Filed: Mar. 6, 2001

Related U.S. Application Data

(60) Provisional application No. 60/187,466, filed on Mar. 6, 2000.

(51) Int. Cl.$^7$ .................................................. G02B 6/34
(52) U.S. Cl. .............................. 385/37; 385/43; 385/50; 385/39; 65/385; 65/378; 65/376; 65/377; 65/398; 65/392
(58) Field of Search ............................. 385/37, 43, 39, 385/50; 65/385, 378, 376, 377, 398, 392

(56) References Cited

U.S. PATENT DOCUMENTS

| | | |
|---|---|---|
| 5,386,490 A | 1/1995 | Pan |
| 5,445,319 A | 8/1995 | Pan |
| 5,562,839 A | 10/1996 | Pan |
| 5,608,831 A | 3/1997 | Pan |
| 5,881,186 A | 3/1999 | Starodubov |
| 6,221,566 B1 | 4/2001 | Kohnke |

OTHER PUBLICATIONS

Birks, T.A., "Twist–Induced Tuning in Tapered Fiber Couplers," Applied Optics, vol. 28 ( No. 19), p. 4226–4233, ( Oct. 1, 1989).
Hernday, Paul, "Polarization Measurements," p. 220–245.

Primary Examiner—Robert H. Kim
Assistant Examiner—George Y. Wang
(74) Attorney, Agent, or Firm—Jones, Tullar & Cooper PC

(57) ABSTRACT

Systems devices and methods in accordance with the invention impart high strength index of refraction patterns to photosensitive optical devices, such as Bragg gratings written in optical fibers. A length of small diameter fiber retaining photosensitivity is fabricated by flame elongation of an optical fiber precursor having dopant containing cladding, using a diffuse, low velocity inverted flame that does not introduce water, OH or $H_2$ into the fiber. By varying the flame velocity during each scan the fiber is diminished to a small, uniform diameter, waist region. Photosensitivity is preserved and enhanced by exposure of the prepared waist region to scanning actinic illumination within an in-diffusing environment of pressurizing hydrogen or deuterium, and controlling the exposure to optimize the photo-induced index change. The photochemistry is balanced to provide a strong index of refraction grating by adjusting illumination instensity and scanning velocity to arrive at a low fraction of a selected photoabsorbing component of the dopant.

8 Claims, 13 Drawing Sheets

FIG. 6  Typical position of coupler waist within flame.
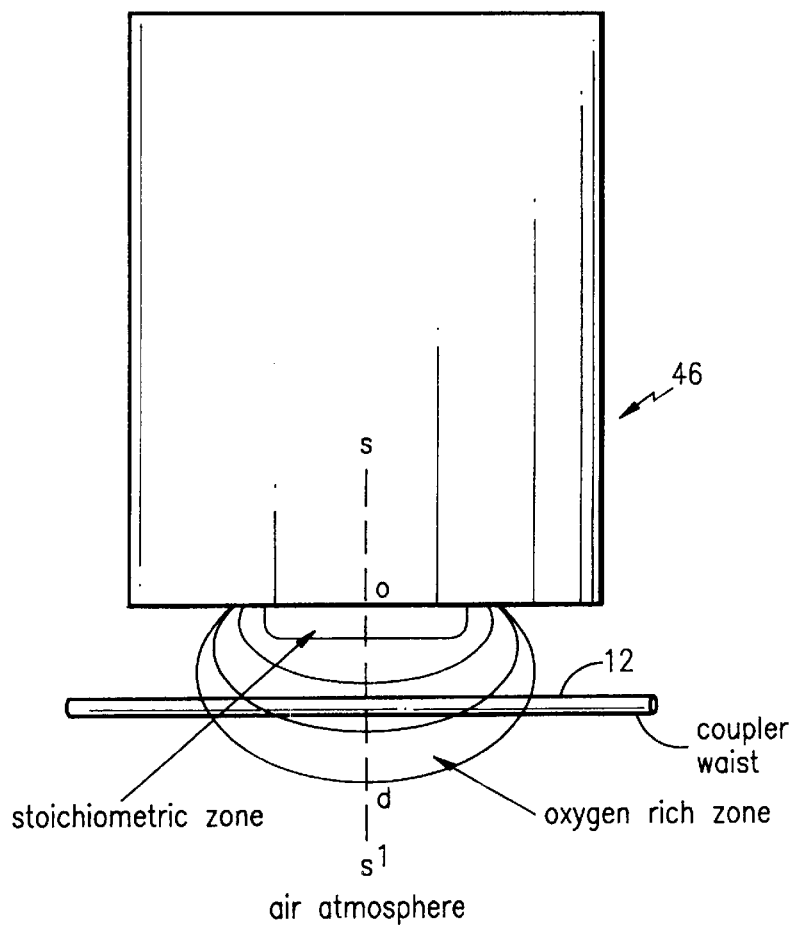
FIG. 7
Flame characteristics T,$\eta$ with distance s below torch along sagital plane s–s$^1$
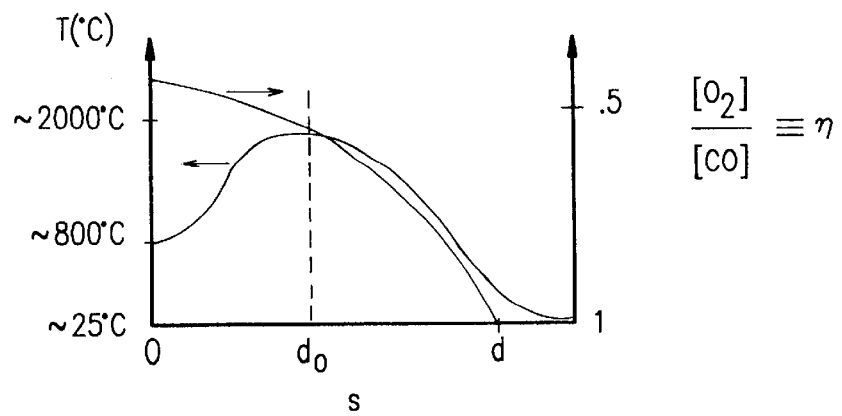
$$\frac{[O_2]}{[CO]} \equiv \eta$$

Temperature characteristics of premixed flame of varying stoichiometry $\eta$ and diluent concentration $[N_2]$ Exposure Process Window

VELOCITY MODULATION

CHANGE OF FLAME POSITION (u)
WITH TIME (t)

FIG. 16 VARIABLE RESPONSE TO EXPOSURE
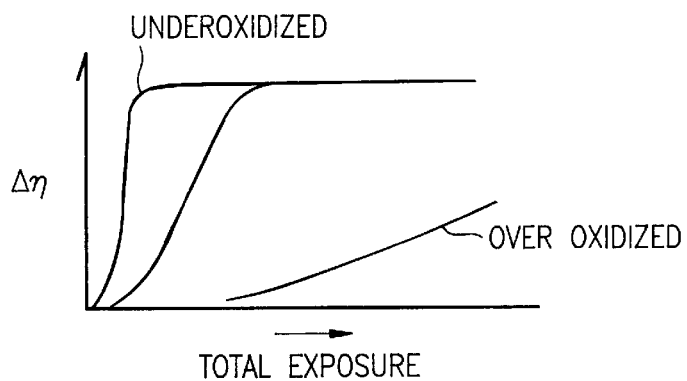
FIG. 17 INDEX VARIATION WITH INTENSITY
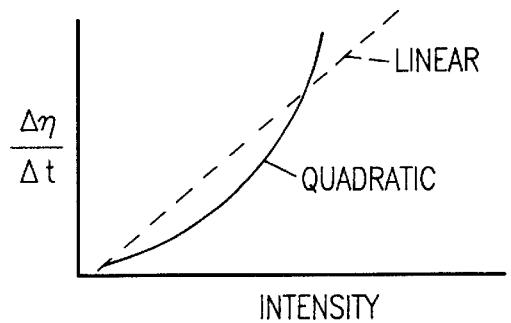
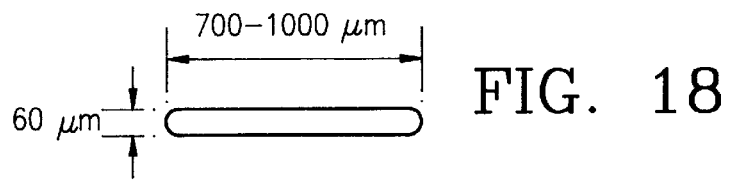
FIG. 18
FIG. 19
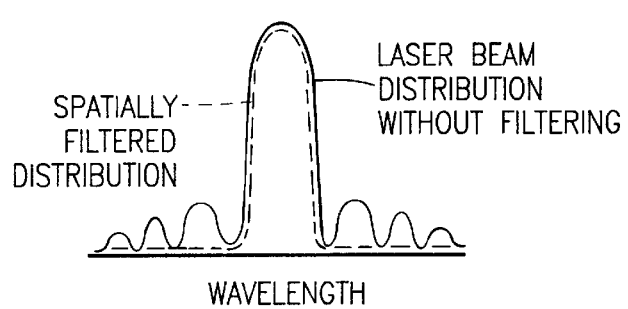

VELOCITY CORRECTION IN SUCCESSIVE PASSES

CORRECTION FOR LOCAL OPTICAL NONUNIFORMITIES

FABRICATION OF PHOTOSENSITIVE STRONG GRATING COUPLERS

REFERENCE TO RELATED CASES

This application relies for priority on a previously filed provisional application entitled "Fabrication of Photosensitive Couplers", filed Mar. 6, 2000 by Xiaolin Tong, Anthony S. Kewitsch and George A. Rakuljic, Ser. No. 60/187,466.

FIELD OF THE INVENTION

This invention relates to photonic couplers and methods of making the same, and more particularly to such components and methods used to fabricate reduced diameter, photosensitive optical fibers to and record grating patterns therein.

BACKGROUND OF THE INVENTION

Modern communication systems are increasingly based on optical transmission through optical fibers, because of the superior bandwidth capabilities of optical signals and the fact that a single optical fiber can transmit many different channels, as by wavelength division multiplexing. To realize the potential of such systems, wavelength selective devices, including couplers and filters, have been recently developed to meet the requisite design and performance specifications. These requirements include precise wavelength selectivity, low crosstalk, flat passbands, low dispersion and low insertion loss. These are all necessary to avoid diminution of signal strength and the introduction of signal distortion, as devices are cascaded to perform various multiplexing and demultiplexing functions.

Many wavelength selective components for these purposes are based upon the approach of embedding or writing a periodic pattern, such as a Bragg grating, in an optical fiber, so as to reflect or transmit only a very narrow wavelength band within a much broader spectral range, for example, the entire C or L WDM band. One example is a four terminal add/drop coupler formed from two optical fibers merged at an intermediate region and incorporating a Bragg grating. A substantial departure from prior concepts that use this basic configuration is described in U.S. Pat. No. 5,805,751 to Kewitsch et al., entitled "Wavelength Selective Optical Couplers", and assigned to the assignee of the present invention. Devices as taught in this patent are grating assisted and typically asymmetric. They operate with high efficiency in typically a reflective mode or alternately in a transmission mode. They are further characterized by a non-evanescent, very small diameter coupling region in which two optical fibers are longitudinally fused. In this coupling or waist region, signals are guided in a glass-air waveguide mode, because the original cladding is now of small diameter and the doped cores of the fibers have been reduced to vestigial elements which have only a small effect on waveguiding. After the fibers are narrowed and merged, a periodic index of refraction pattern Bragg grating) is written in the small diameter coupling region, which is typically less than about 10 microns in cross-sectional dimensions but is photosensitive because of its dopant content, the use of in-diffusion of a photosensitizing gas, or both.

The process used to form a merged coupling region presents some unique problems involving multiple disciplines that extend well beyond the present day techniques used to produce fused splitters. For example, to illuminate the coupling region with uv light through a mask so as to record a grating pattern, the target material must remain photosensitive. However, the very small diameter coupling region must be formed by controlled elongation and fusion as the optical fiber is heated to the softening point, a process that can significantly affect the photosensitivity of the glass. To maintain low loss and control of elongation, the heating is generally best done with a reciprocating flame, recognizing that the temperature of the flame as well as the chemical composition of the heating gas can influence the subsequent photosensitivity. Furthermore, because the fibers in the coupling region are of micron range diametral size, the fibers cannot withstand the force of a flame of substantial velocity without deflecting and/or deforming. Moreover, the strength of the grating that is ultimately written is dependent on all stages of the process, from initial photosensitivity of the starting fiber cladding material, through heating and drawing, to the completion of an exposure step. The interrelationships of these factors have not heretofore been fully understood or utilized, but it is clear that improvements can be made in grating efficiency, passband characteristics and in product yields as well.

While achieving a photochemical state in which photosensitizing potential is brought to a high level is more than adequate in and of itself for many purposes, more is increasingly being required of photonic devices using index of refraction patterns. For example, workers in the art are now extending systems and devices toward 25 GHz and 50 GHz applications, thus requiring narrow bandwidth gratings in fibers and couplers. Higher performance is also being sought in add/drop devices for more general use. To meet the increasingly stringent requirements of the modern era, spatial variations in the effective index of variation change (chirp) must be very small, approximately a factor of 10 less than the desired DWDM periodicity. In numerical terms 100 GHz filters require a chirp of less than 0.08 nm, which equates to 0.0008 uniformity in the index of refraction change. For 25 GHz filters the chirp and uniformity of index of refraction change must be 4 times tighter.

Maintaining adequately low crosstalk (<−25 dB) further demands that the spatial variation of the index of refraction be extremely smooth along the grating length. Specifically, and superfluous periodicities (ripple) in the grating of between 0.5 microns to 1 mm must be removed to a level better than 5%. The problems of meeting such requirements are compounded when one considers that the exposure response of the photosensitive material varies non-linearly with exposure time, and in a variable manner dependent on the photochemistry of the material. In addition the photosensitivity of the target material varies non-linearly as a function of laser intensity, and the intensity of a beam projected through a varying (i.e. apodized) phase mask also is dependent on position relative to the phase mask.

SUMMARY OF THE INVENTION

Systems and methods in accordance with the invention include the use of photosensitizing dopants in a precursor element, such as an optical fiber, heating the fiber during drawing with a diffuse and distributed low hydrogen content flame of very low velocity and of controlled temperature. As the fiber is tensioned, it is locally heated in a repetitive manner by reciprocating movement of the flame until it is drawn down to a selected length of substantially uniform diameter. In illuminating this target region to write a periodic grating, the intensity of the actinic radiation is varied in controlled fashion as a photosensitizing gas is diffused into the fiber, preferably at elevated pressure. The index of refraction change in the target may be further enhanced by optimizing grating growth through balancing of light source intensity, scan velocity, and blue light luminescence from the target fiber.

In more specific examples of systems, devices and methods in accordance with the invention, the target region of a photonic device, i.e. an optical fiber or fibers in which a grating is to be written, includes a constituent (dopant) providing photosensitivity to uv illumination. This region is gently heated with a low velocity, inverted reciprocating flame that locally surrounds the target area of optical fiber. The flame is preferably a mixture of CO and $O_2$, with an inert gas assuring that OH and water by-products will be minimized. Relative humidity and temperature of the surrounding air atmosphere are maintained within selected limits. Flame temperature can be reduced by mixing with an inert gas (such as $N_2$), the amount of which can be adjusted to maintain a desired temperature. After the heated fiber is adequately elongated, the photochemical characteristics of dopants within the fiber, together with the exposure process, determine the grating growth characteristics. By subjecting the fiber during actinic illumination to indiffusion of high pressure deuterium or hydrogen (possibly heating the fiber at the same time) and by maintaining the uv illumination intensity above a selected threshold, the photo-induced index changes contribute to achieving an extremely strong grating. Furthermore, varying the polarization of the uv writing beam during exposure may optimally utilize the photosensitive dopant sites within the glass.

A feature of the invention is the provision of a torch of ceramic material including a diffuser of compressed porous material at its outlet. Pore sizes in the diffuser range from 30 to 100 microns, and the orifice area of the diffuser is about 3×6 mm in area, providing a distributed volumetric flame of low velocity that is at least initially in stoichiometric balance, or alternatively oxygen rich to a degree. Since CO is one constituent, care is taken to ensure against contamination by iron impurities. The flame is maintained at about 2000° C. and is of a visible color which allows the fiber location relative to the flame to be precisely determined. The diffuser has the advantageous property that it stabilizes the flame characteristics to reduce thermal fluctuations, which improves the uniformity of the fabricated coupler. Since each coupler is elongated to the same length at the same rate (a characteristic of the manufacturing process that is unique to the asymmetric coupler described here, and is not the case for 50/50 couplers, for instance), multiple fibers may be drawn at the same time. An array of such torches can be used in combination to provide a multiple coupler fabrication station.

Other features in accordance with the invention contribute to the achievement of diametral uniformity in the waist region, and to improved grating strength. The fiber is advantageously held in the flame volume in a region in which the combustible constituents are in approximately stoichiometric proportions, and at or close to maximum temperature, reducing sensitivity to variations. By velocity modulation of the reciprocating scanning motion along the fiber, in which the flame is at a lower velocity in the central region of the scan, then accelerates to a higher velocity until it decelerates and accelerates rapidly to reverse at end points, a short waist region of very uniform diameter is formed in which the grating can be written.

Other methods in accordance with the invention enable realization of the potential imparted by the disclosed photochemistry concepts. Index of refraction gratings for narrow passband add/drop devices and filters having very low crosstalk are achieved by modulation of beam residence time while scanning a photosensitive target element through a selected pattern. In accordance with one example, a photosensitized coupler is scanned repeatedly and unidirectionally, in time separated fashion, by a laser beam whose scanning velocity is varied relative to the length of the grating that is being imprinted. Exposure is ramped up rapidly to a scan start point, varied from a nominal level as the beam travels along a photomask which defines the pattern to be recorded and then ramped down, so that exposures at the terminii of the grating merge smoothly and have reduced crosstalk and backreflection effects. Between these end regions in this example, velocity and therefore exposure, is controlled by sensing photoluminescence at a selected wavelength from the element, and using the sensed signal to provide a constant average index of refraction by compensating for variations caused by the photomask pattern, and also short term variations arising from local non-uniformities. In the successive passes until a desired final result is achieved the modulation minimizes effects from non-linear factors such as sensitivity characteristics and response to laser intensity. Consequently narrow gratings having small chirp, minimized spatial variations and low cross-talk have been provided.

BRIEF DESCRIPTION OF THE DRAWINGS

A better understanding of the invention may be had by reference to the following description, taken in conjunction with the accompanying drawings, in which:

FIG. 6 is an illustration of the torch and the flame characteristics, illustrating variations in chemical composition within the flame volume relative to a fiber being elongated;

FIG. 7 is a graphical representation of the relationships between temperature and $[O_2]/[CO]$ ratio with distance s below the torch along the sagital plane s–s';

FIG. 16 is a graph depicting variations in index of refraction versus exposure for different conditions of oxidation in a photosensitive waveguide element;

FIG. 17 is a graph showing index of refraction variations of a photosensitive element in response to intensity variations;

FIG. 18 is a diagrammatic view of the profile of a laser beam spot used in the method;

FIG. 19 is a graph of laser beam energy distribution vs. wavelength both before (solid line) and after (dotted line) spatial filtering;

DETAILED DESCRIPTION OF THE INVENTION

Figure 1:
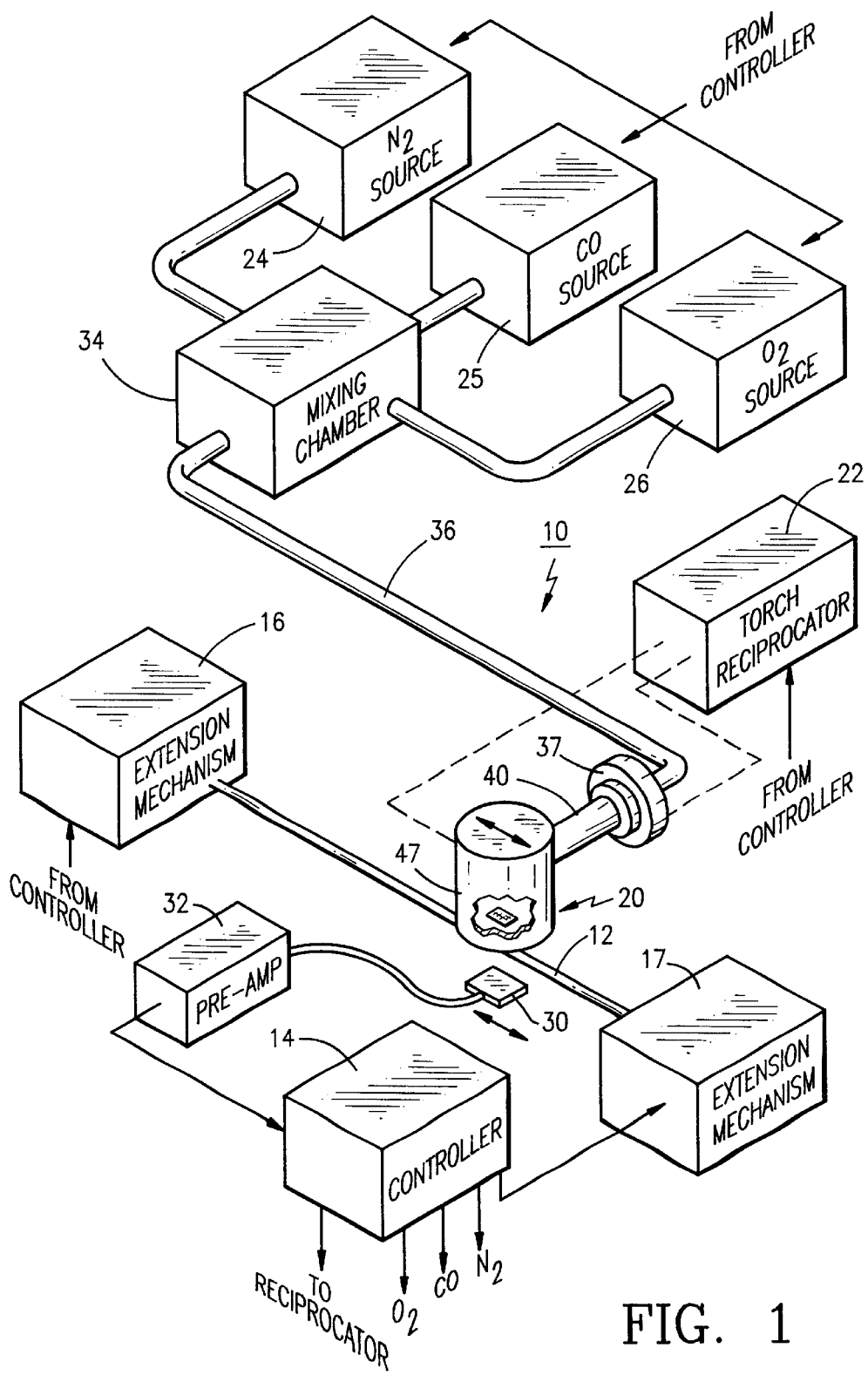
FIG. 1 is a combined perspective and block diagram view of a system, including a flame generating torch assembly, in accordance with the invention.
Figure 2:
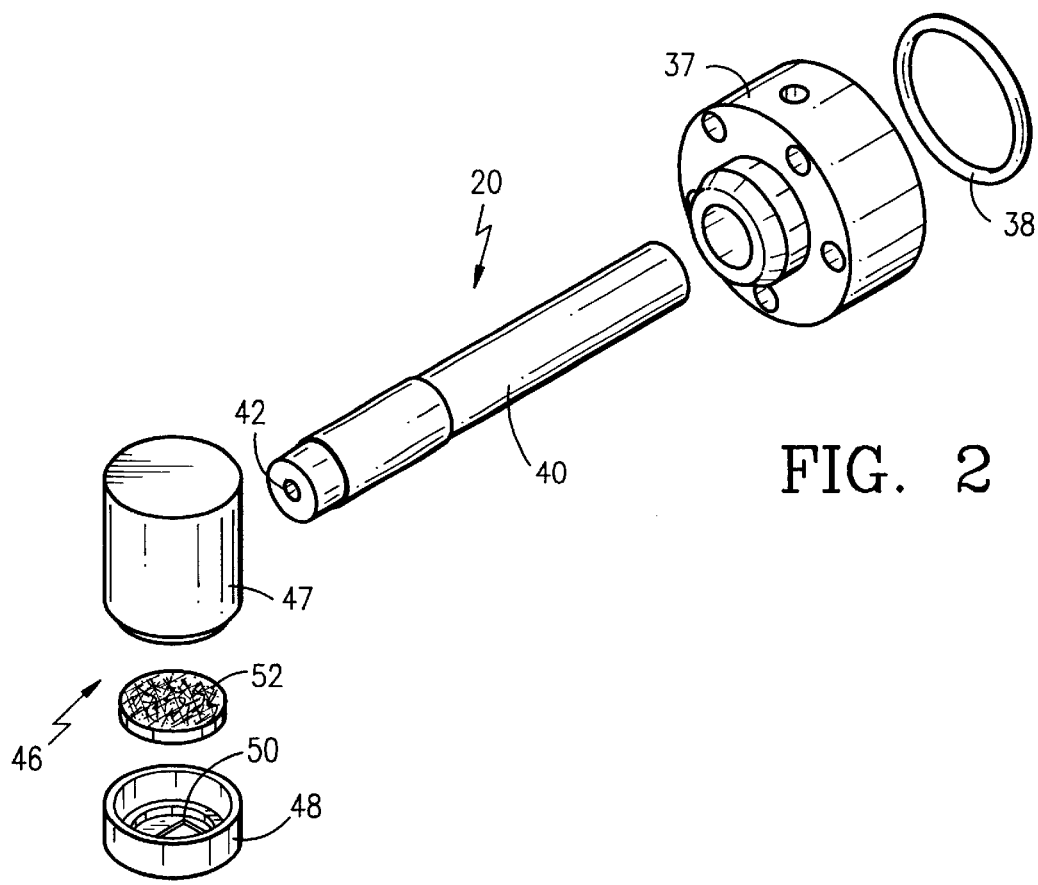
FIG. 2 is an exploded view of an exemplary torch assembly for use in the system of FIG. 1.
Figure 3:
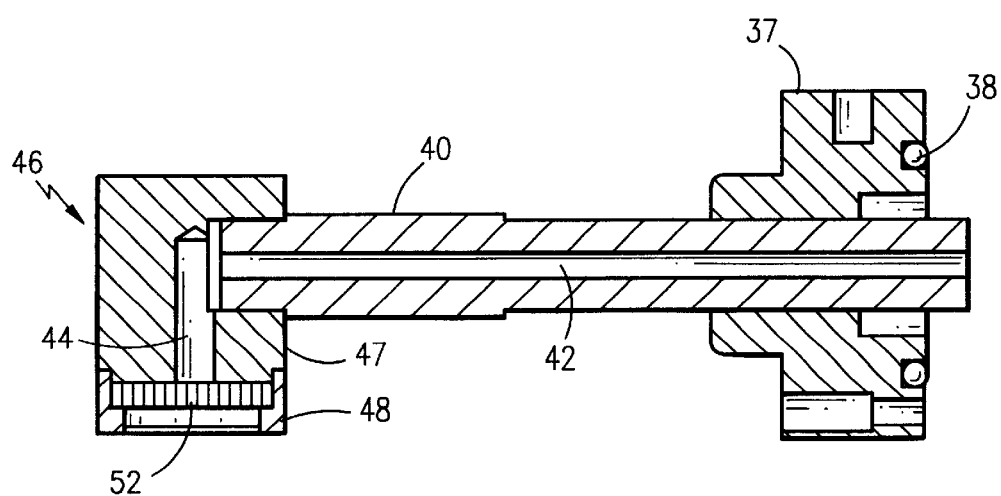
FIG. 3 is a side sectional view of a portion of the torch assembly of FIG. 2.

A system 10 for drawing single or merged optical fibers 12 (initially typically of 95 to 125 micron size), referring now to FIG. 1, uses a fiber drawing mechanism operating in a sequence governed by a controller 14. For brevity specifics as to the fiber drawing mechanism are not included, since precision motion control and automation equipment of this broad type are generally available. It suffices to say that stretching of the fiber 12 is effected by a pair of spaced apart extension mechanisms 16, 17 which are translated apart (either or both can move) in predetermined fashion to establish and then maintain tension as a moving torch 20, reciprocating along the fiber, locally heats the fiber 12 to conditions of plasticity. Dependent on residence times under the flame and the cumulative effects of scanning, the tension begins and then continues to elongate the fiber. The elongation or translation is terminated when the fiber 12 has been stretched sufficiently to form a narrow waist region in which a Bragg grating is to be written. Since the amount and rate of stretching is predefined in general terms, multiple couplers can be stretched simultaneously, significantly reducing the manufacturing cost. The fiber 12 includes sufficient dopant (typically germanium) within the cladding to provide initial photosensitizing conditions which will support subsequent photo- and thermal-induced reactions in writing an index of refraction pattern.

The torch 20 itself is reciprocated or oscillated along the longitudinal axis of the fiber 12 by a reciprocator 22 operating over successively increasing distances and at rates specified by the controller 14. The length of the waist that is formed is dependent on the end limits of the torch scanning distance as well as the thermal dynamics. In this example the torch scanning distance starts at approximately 4 mm and increases to about 24 mm on completion. This increasing amplitude reciprocation, together with adjustment of the flame temperature during scanning if preferred, results in a waist region of modified dumbbell shape, since one of the fibers tarts slightly smaller than the other due to prestretching, as disclosed in the patent to Kewitsch et al. The resultant coupler waist has a selected and essentially uniform cross-sectional diameter, here of less than about 10 microns, and has adiabatically tapered transition sections on both ends of the waist that merge into the principal fiber lengths of nominal diameter. This is also known from the Kewitsch et al. patent referenced above. Other factors pertaining to achieving asymmetry and minimizing sensitivity to polarization are also of significance but merely referred to briefly here since the present objective is to provide controlled elongation, uniformity of the coupler waist cross sectional dimensions and high grating strength.

The torch 20 is fed with a combination of gases from individual sources 24, 25, 26 which supply nitrogen ($N_2$), carbon monoxide (CO) and oxygen ($O_2$) respectively. Each of the gas sources 24, 25 and 26 is controllable in flow rate by command signals from the controller 14, although manual adjustments can optionally be used where the process is to be essentially invariant over a long run. Where conditions are variant, and for initial testing, a thermocouple 30 can be positioned in the path of the flame, to provide a temperature level signal through a pre-amplifier 32 to the controller 14. Adjustments in the temperature of the flame can then be made by directing the $N_2$ source 24 to change the flow rate of $N_2$ gas correctively. While a different inert gas can be employed, nitrogen is both readily available and relatively inexpensive. Typical flow rates of the individual gases to a single torch lie between 50 and 150 sccm.

Referring also now to FIGS. 2–5 as well as FIG. 1, the gases from the three sources 24, 25 and 26 are intermingled in a mixing chamber 34 and fed along a flexible tube 36 through a base 37, sealed against its movable support (not shown) by an O ring 38, to a feed tube 40 which is a part of the reciprocating torch 20. The feed tube 40 is about 6.35 mm in outer diameter and includes an interior conduit 42 feeding into a small central chamber 44 in a torch head 46. The cylindrical outer diameter of the torch head 46 is about 1.27 cm in diameter, and 1.27 cm in length. The torch head 46 and feed tube 40 can be readily fabricated from Macor ceramic, alumina, metals, or other materials that can be formed and that withstand elevated temperatures. The torch head 46 is formed from two pieces, a principal body 47 and an end cap 48 which has an internally inset rectangular outlet 50 within which is lodged a diffuser 52 of porous material that forms an areal orifice for the flame. The pores are of the range of 30 to 100 microns in size, and are provided, for example, by compressing layers of fibers of heat resistant material (e.g. silicon carbide, alumina, platinum, etc.) into a mask of about 3×6 mm to fit within the outlet 50. The rectangular shape of the diffuser outlet 52 distributes the flame to provide enhanced flame uniformity perpendicular to the longitudinal axis of the fiber and introduces a flow impedance which substantially lowers flame velocity. This not only reduces alignment tolerances in the system, but has significant benefits in terms of thermal interchange and shape uniformity, as described below.

In operation, the gas flows are adjusted to give a volumetric flame which is at a stable temperature of approximately 2000° C. in this example. Under various operating conditions the controller 14 may vary the flame between about 1600° C. and 2200° C., to shape the coupler while stretching it.

FIG. 6 illustrates the typical position of the narrow fiber 12 waist within the flame. The burning $CO$—$O_2$—$N_2$ gas mixture emitted from the torch body is diffused by the bottom diffuser element and forms the flame volume, which is initially directed downwardly but thereafter reduces in velocity under convective upward flow until the products of combustion reverse in direction to flow upwardly. It is usually preferred to hold the $O_2/CO$ in approximately stoichiometric proportions although an oxygen rich mixture has certain benefits as to photosensitivity, as described below. The nitrogen is used to dilute the gas and reduce the temperatures of the flame. Near the edge of the flame, and within the expanding volume $O_2$ from the atmosphere results in oxygen rich zones, while the region immediately adjacent the torch orifice exhibits the gas composition determined by the setpoints of the mass flow controllers.

FIG. 7 illustrates the temperature and chemical composition of the flame with distance s below the torch along the sagital plane indicated by s–s' in FIG. 6. At a location $d_o$ the flame attains its maximum temperature at a region of relative insensitivity of temperature to position under the flame. This location is optimal in that the heating of the fiber is most stable if the flame does not fluctuate, and stability is desirable because it helps to ensure that the diameter and shape of the coupler waist are most uniform at this location.

A farther requirement is that the chemical composition of the flame at the location do should be adequate to preserve photosensitivity during the subsequent uv exposure. It is desirable that the coupler waist be sufficiently oxidized, meaning that the $[O_2]/[CO]$ ratio at the flame location surrounding the coupler waist lies between 0.5 (stoichiometric) and 1 (oxygen rich). The additional oxygen may be added to the flame to achieve a highly oxidized state, but in the example given, in which expanding zones in the volume of emitted flame become richer in oxygen, satisfactory results can usually be expected.

Figure 8:
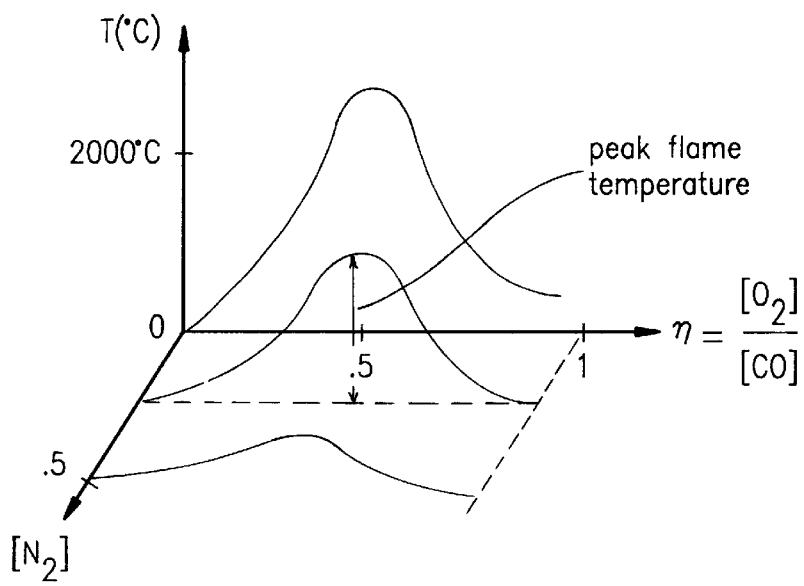
FIG. 8 is a graphical representation of the temperature characteristics of a premixed CO—$O_2$—$N_2$ flame initially in stoichiometric balance.

FIG. 8 illustrates that close to stoichiometry, at the peak flame temperature, the temperature is also relatively insensitive to small fluctuations in the $[O_2]/[CO]$ ratio. This operating point is highly desirable because it reduces the dependence of the heating characteristics on environmental conditions such as humidity, which can contribute to drift of the flame composition and temperature. Preferably, relative humidity in the environment is controlled to within ±3% and temperature variations with ±2° C.

Figure 9:
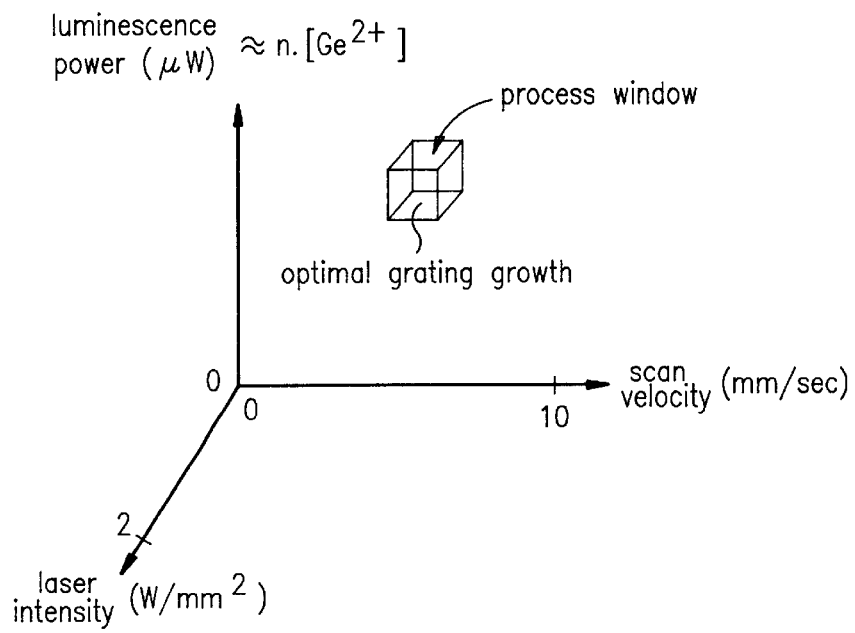
FIG. 9 is a conceptual diagram illustrating the establishment of exposure "process window" space to maintain optimal grating growth characteristics, in terms of the primary exposure process control parameters namely luminescence power, scan velocity and laser intensity.

This optimization of the coupler photochemistry is of importance to recording high performance gratings within the fused coupler waist. Once this is achieved, several other factors must be adjusted to achieve a high yield exposure process. FIG. 9 is a schematic diagram of the what can be called an "exposure process" window. Luminescence power provides a metric for the coupler photochemistry, for it shows experimentally a proportionality to the concentration of $[Ge^{2+}]$. Practically, to maintain the process, it is preferable to control three parameters, namely, blue light luminescence, uv laser intensity and exposure scan velocity. We have optimized photochemistry to achieve a $[Ge^{2+}]$ fraction of 0.1 or less. This translates into a value of the luminescence power in uW. We have found that an incident uv laser intensity of 2 $W/mm^2$ at 244 nm and a laser scan velocity of 0.5 mm/sec is optimal for these conditions.

Consequently, starting with a small reciprocation oscillation distance of about 4 mm, a length rather than a focus point of fiber 12 is quite uniformly heated wherever the flame impinges on the fiber. The end regions of these lengths which are traversed by the flame on each pass are heated to smooth temperature gradients the edges of the flame thus introduce smooth and adiabatic taper transitions. Because the flame is directed downwards (FIGS. 2 and 6), the convective heat flow tends to reverse and move upwards once the flame velocity is dissipated. The flow impedance of the diffuser 52 reduces the gas pressure (FIG. 4), so that the flame action is sufficiently gentle so as to not distort or deflect the reduced diameter fibers. When the dominantly heated central region relative to the scanning flame becomes plastic enough for stretching to take place, the extension mechanisms 16, 17 begin to draw out the fiber 12, so the torch 20 scan distance is also increased, ultimately to a maximum of about 24 mm.

Figure 10:
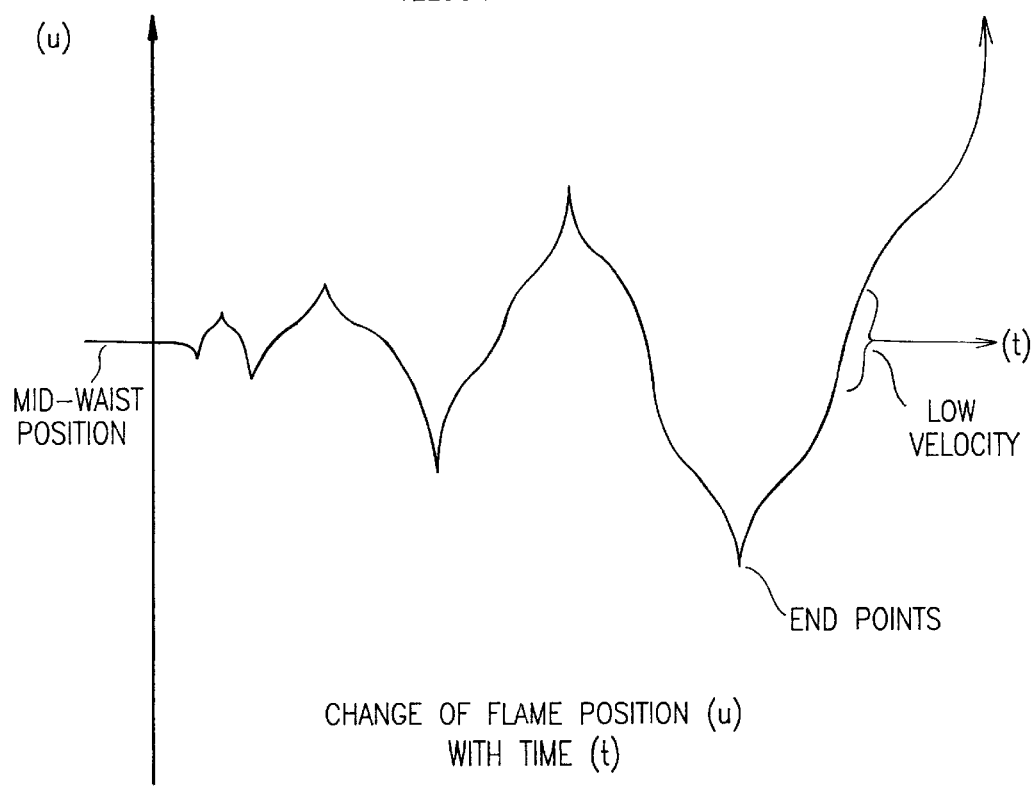
FIG. 10 is a diagrammatic representation of the change of scan position (u) on a torch with time (t) when employing velocity modulation of a reciprocating flame.
Figure 11:
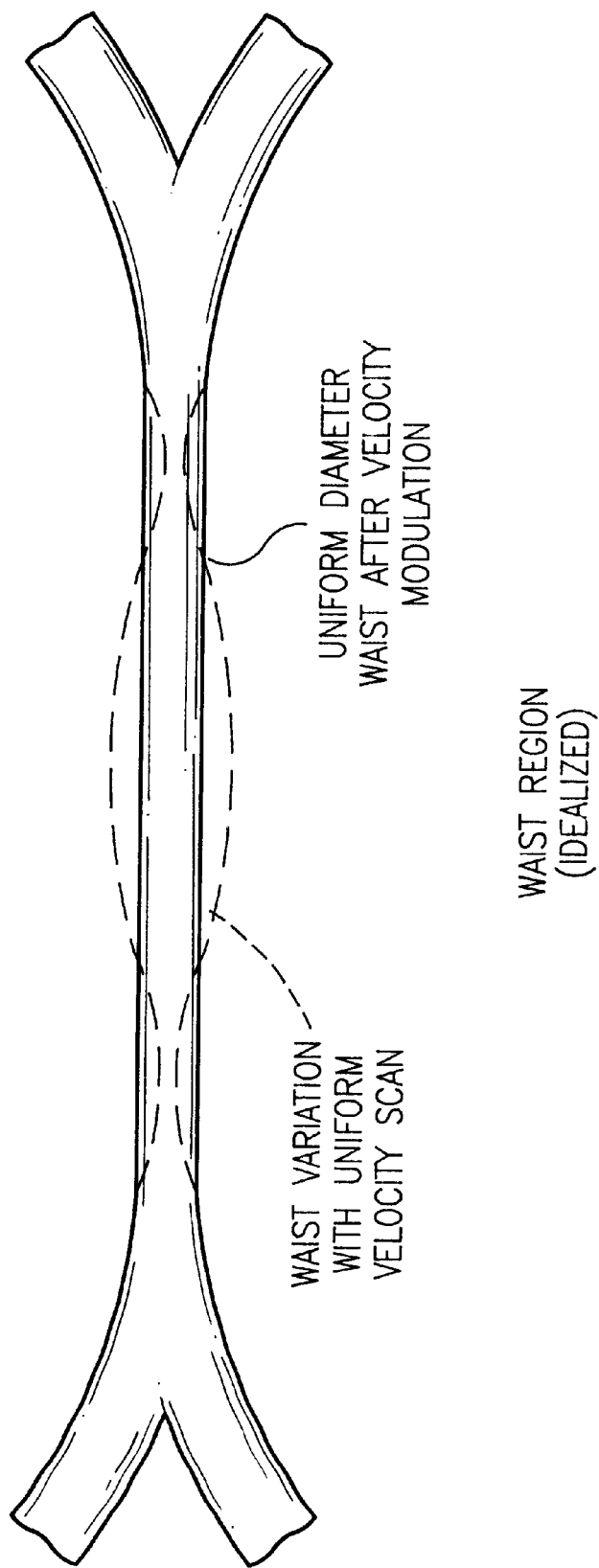
FIG. 11 is an enlarged representation (not to scale) of differences in fiber diameter achieved using velocity modulation as opposed to uniform scan velocity.

Note that near the turn around or reversal points of the reciprocating motion, the flame would tend to have a greater residence time on the fiber 12 if the unidirectional velocity were essentially constant over the majority of the span. This would then lead to a greater reduction of diameter of the fibers near the endpoints. Such an effect is eliminated by velocity contouring the torch reciprocation, using lower velocity in the central region of each scan. That is, we program the torch scanning velocity to be higher approaching the turn around points than at the center of the reciprocation to provide a substantially uniform waist diameter. Such velocity modulation is depicted graphically in Fig. 10, where change of position (u) with time (t) is seen to be non-uniform within each span, as the spans increase with time. That is, velocity in mid-span is relatively low (e.g. 1000 $\mu$m/sec) but the torch is speeded up substantially thereafter (to, e.g. about 20,000 $\mu$m/sec). As the end or reversal point for the scan is approached, the flame is rapidly decelerated and accelerated in the reverse direction. In consequence, as seen in FIG. 11, the resultant waist region (solid line) is of uniform diameter whereas the waist of a fiber produced by constant velocity scans (dotted line) is non-uniform with a distention at the center. Diametral variations in the waist region are typically maintained within 0.25 microns.

Because the flame generated by the $CO$—$O_2$ reaction is blue, the fiber location in the flame can easily be set and checked. Also, the capability for photosensitizing the fiber is not degraded by this flame because water, $H_2$ and OH are not present to be diffused into the fiber. Diffusion of these molecules into the glass would neutralize potential photoreactive sites and reduce the amount of uv induced index change. This torch and flame technique, together with CO and $O_2$ combustion, have proven to provide superior results in terms of subsequent grating strength during exposure.

A consideration to be borne in mind when using CO in the mixture is that iron impurities or compounds in the gas or in exposed surfaces are highly reactive with CO. Over time this reaction can clog the diffuser and impede flow, so clean gases and non-reactive surfaces are used to extend part life.

Methods of Enhancing Photosensitivity

Photosensitivity in a Ge doped fiber is enhanced and optimized by controlling the factors which affect photon absorption and index change in the illumination processes. The heating gas, as seen above, is about 2000° C., and the premixed gas is in an oxygen rich condition. During stretching the oxygen rich environment keeps most of the Ge in the fiber as $GeO_2$ rather than as GeO; that is, the coupler is oxidized.

The dominant mechanism of photosensitivity in this process is also different from what has been considered before, because the illumination step is accompanied both by heating and by deuterium loading, i.e. the diffusion of deuterium into the doped glass. The use of deuterium is assumed in the following but hydrogen can be used alternately.

While the approach to enhancing the photosensitivity is based on our experimental findings, theoretical modeling is instructive. However, the conclusions drawn in this invention do not depend of the validity of this simplified theoretical model described below. The uv photon (~5 eV) absorption associated with the Ge dopants includes two parts, $Ge^{2+}$ and $Ge^{4+}$. In a coupler, a photon can be absorbed by $Ge^{2+}$ associated oxygen vacancies and generate heat Q plus a blue light photon $\upsilon_b$ (~2.5 eV), which provides a luminescence signal:

$$h\upsilon + GeO \rightarrow Q + h\upsilon_b \qquad (1)$$

In the presence of deuterium, two photons also can be absorbed by $Ge^{4+}$ to form a $Ge^{2+}$ and a pair of OD:

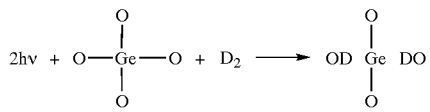

The total absorption coefficient $\alpha_{to}$ is:

$$\alpha_{to} = \alpha_2 + \alpha_4 \qquad (3)$$

where $$\alpha_2 = \sigma_2 n[Ge^{2+}]; \ \alpha_4 = \sigma_4 n[Ge^{4+}]P_D \qquad (4)$$

$\sigma_2$ and $\sigma_4$ are the cross sections for $Ge^{2+}$ and $Ge^{4+}$, respectively, and n is the total volume density of Ge. $P_D$ is a factor representing the probability of deuterium atom to be localized about a Ge site. Each photon absorbed by $Ge^{4+}$ will trap an OD instantly, which causes index change. Each photon absorbed by $Ge^{2+}$ will emit a photon (in the 400 to 700 nm band) and a certain amount of heat regardless of deuterium concentration. The heat can elevate the local glass temperature sufficiently to enhance deuterium diffusion.

A deuterium ion is trapped at sites exhibiting a continuous distribution of activation energies consisting of deep traps and shallow traps. We make a simplifying assumption that deep traps have an associated absorption cross section $\alpha_4$ and the shallow traps have an associated absorption cross section $\alpha_2$. Typically, the deeply trapped deuterium shows slow decay (thermally stable) and shallow trapped deuterium shows fast decay (thermally unstable). The fast decay typically corresponds to an index of refraction decay of about 30% after annealing. Approximately, the index change caused by shallow trapped deuterium is about one third of the total index change after exposure.

The $Ge^{2+}$ associated absorption $\alpha_2$ is proportional to the concentration $[Ge^{2+}]$. The $Ge^{4+}$ associated absorption $\alpha_4$ is proportional to the concentration $[Ge^{4+}]$ and $P_D$. Deuterium should have lower potential energy around the Ge sites than the Si sites. This means that most deuterium will occupy the Ge sites rather than the Si sites in thermal equilibrium. A Fermi-Dirac distribution is used to represent $P_D$. The Fermi level lies between the potential energies of Ge site and Si site. The photo-induced index change is proportional to the total number of photons absorbed by $[Ge^{+4}]$, given by $N_{ph}$ $$\Delta n_{ph} \propto N_{ph} \qquad (5)$$

For efficient exposure, the $[Ge^{4+}]$ should be close to 100%, and $[Ge^{2+}]$ should be close to 0%; that is, the coupler should be oxidized. This can be achieved during coupler fabrication. However, if the material is over-oxidized, it starts out essentially uv transparent, and there is a significant uv exposure threshold to overcome before substantial grating growth can proceed. Also, the deuterium atoms should be located at the $GeO_2$ unit cells rather than the $SiO_2$ unit cells. In thermal equilibrium, the ratio of the concentration of deuterium in the $SiO_2$ cells to the $GeO_2$ cells is:

$$C_{Si/Ge} \sim Exp[E_{Si} - E_{Ge})/K_B T] \qquad (6)$$

The activation energy $E_{Si}$ is smaller than $E_{Ge}$ in a coupler. At room temperature, it takes approximately 5~10 hours to reach the thermal equilibrium level. A couple of methods can be considered to reduce the time to achieve thermal equilibrium. One method is to heat up the coupler while $D_2$ loading using a laser or an infrared lamp.

The grating growth rate depends on the uv laser intensity, $[Ge^{4+}]$ concentration and the deuterium concentration. $[Ge^{4+}]$ concentration is influenced by the local chemical composition and temperature of the flame during coupler fabrication. The photosensitivity of the material is enhanced for a given $[Ge^{4+}]$, deuterium concentration, and laser intensity if the deuterium occupies a site near the $GeO_2$ unit cell rather than the $SiO_2$ unit cell, which is not photosensitive. Both the photo-induced index change and thermal-induced index change will cause a dc wavelength shift or spatially uniform index of refraction change. Photo-induced index change is completed almost instantly once a photon is absorbed by $Ge^{4+}$. Thermal-induced index changes may continue to grow even after 15 min in the dark. It is well known that when hydrogen or deuterium is located at a glass unit cell, it causes the size of the unit cell to expand, leading to an index change.

Figure 12:
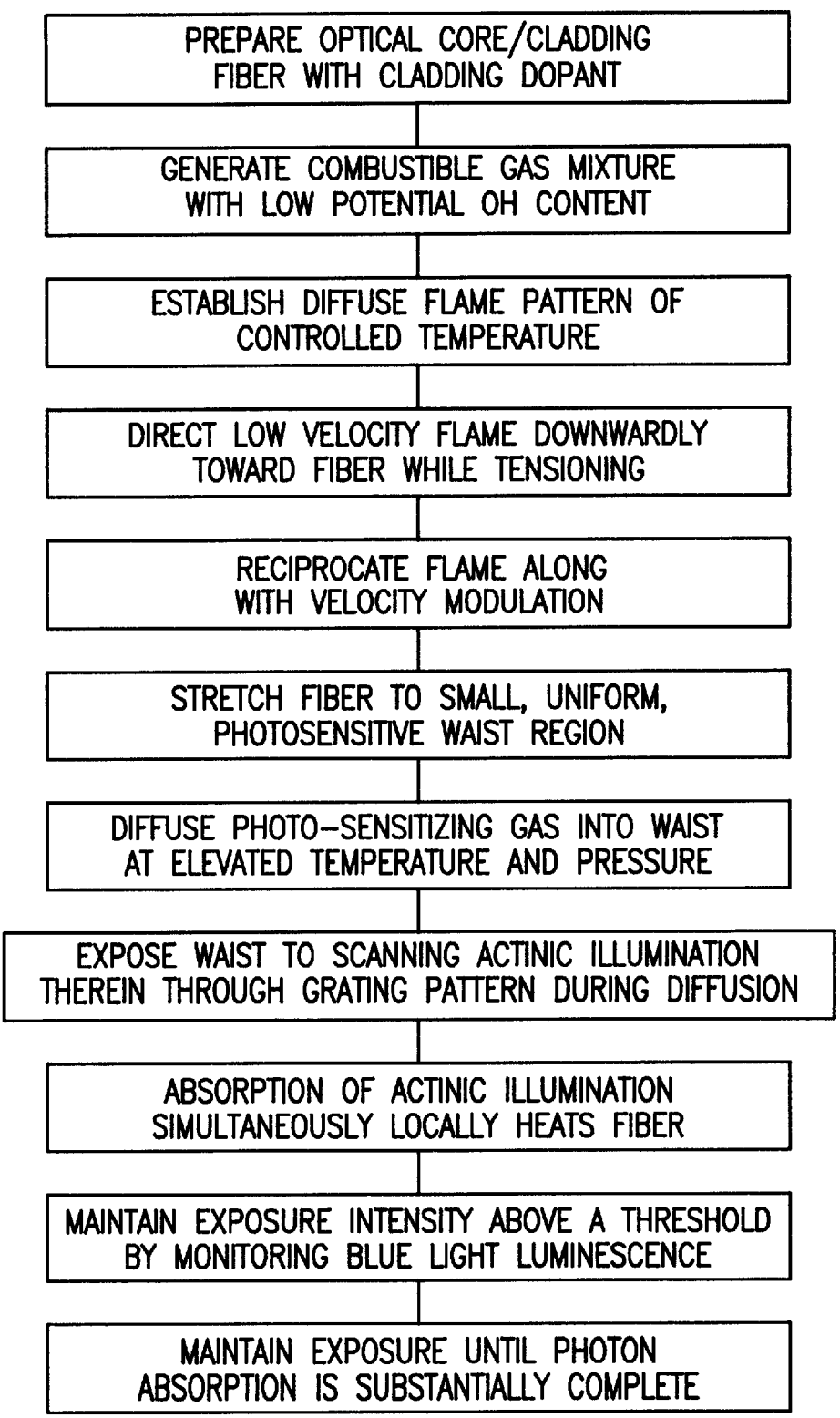
FIG. 12 is a flow chart of the steps involved in methods in accordance with the invention for writing high efficiency gratings.

Methods of preparing a high strength Bragg grating in an optical fiber in accordance with the invention have physical, thermal and chemical aspects that should be carefully interrelated, or shown in the generalized sequence of FIG. 12. Starting with an optical fiber of core/cladding construction but one in which the cladding itself is photosensitized by incorporation of significant dopant (e.g. germanium) in the cladding, the fiber is subjected to a flame elongation process. The flame for fiber elongation is generated by mixing CO and $O_2$, or other combustible gas combinations having low or no potential for OH formation. At the same time the maximum temperature of the flame is controlled by inclusion of an adjusted proportion of inert gas (e.g. nitrogen) in the mixture. Further relative humidity is preferably controlled to within a relatively close range, such as ±3%, and temperature is stabilized, as to +2° C., within the process environment.

By passing the pressurized mixture through an areal diffuser element having outlet dimensions on each side at least an order of magnitude greater than the fiber dimension, a distributed low velocity flame is directed toward the fiber. The volumetric and flicker-free flame is directed downwardly against the fiber, which is held in a generally stabilized region of the flame volume, and is itself not materially deflected or displaced by the flame dynamics. By reciprocating the flame along a length of the fiber with increasing scan distances, as the fiber is held under a stretching tension, localized heating of the span is induced that is greatest at a central region, at which a narrow waist is to be formed. The localized heating causes localized plasticity in the fiber, so that the waist region is elongated and reduced in diameter to a selected dimension, usually less than 10 microns, as tapers of an adiabatic geometry are created at each end. The waist is essentially uniform, typically less than about ±0.25 microns, because the flame motion is velocity modulated within each unilateral scan. That is, in the center of the scan the velocity is relatively low, such as 1000 µm/sec, but then the velocity is substantially increased, as to about 20,000 µm/sec, until the end or reversal point is approached. The flame is then rapidly decelerated to the end or reversal point and rapidly reaccelerated in the opposite direction toward the maximum velocity zone before the center position is approached. Increasing the length of the reciprocation continues until the desired waist cross-section dimension obtained.

Because of this process, in which the gas chemistry and the flame characteristics are controlled, the fiber waist region retains its photosensitivity due to the presence of photosensitive dopants in an oxidized state. To further enhance these properties for writing a photorefractive pattern in the waist, the fiber is held in a pressurized hydrogen or deuterium atmosphere at temperature, and then or later illuminated with actinic radiation to form the photorefractive index of refraction pattern desired. For a Bragg grating, for example, a diffractive mask of apodized characteristics may be scanned by a laser beam which then impinges on the waist. The exposure is repeated or maintained above a predetermined intensity threshold, as by measuring the blue light luminescence from the fiber during scanning and varying the uv laser intensity and exposure scan velocity to achieve a predetermined blue light luminescence variation as a function of the position of the uv illumination along the waist. A typical uv laser intensity is about 2 W/mm$^2$ at 244 nm and the laser scan velocity is about 0.5 mm/sec. The polarization of the illuminating beam during exposure can optionally be varied if desired. The exposure is continued until further photon absorption is no longer of significant benefit, indicating that the photorefractive effect has resulted in maximization of the index of refraction pattern, typically corresponding to an index of refraction modulation amplitude of 0.001 to 0.003.

Figure 13:
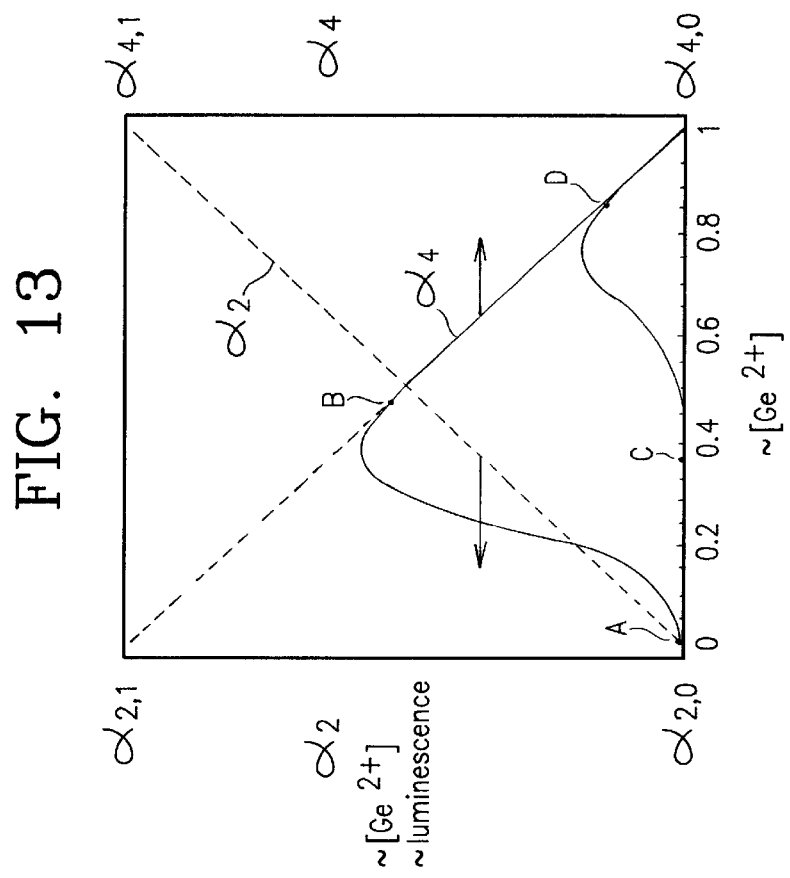
FIG. 13 illustrates the evolution of uv absorption $\alpha_2+\alpha_4$ and index change (proportional to $\alpha_{2,final}-\alpha_{2,initial}$) for two couplers of different starting photochemistry.
Figure 4:
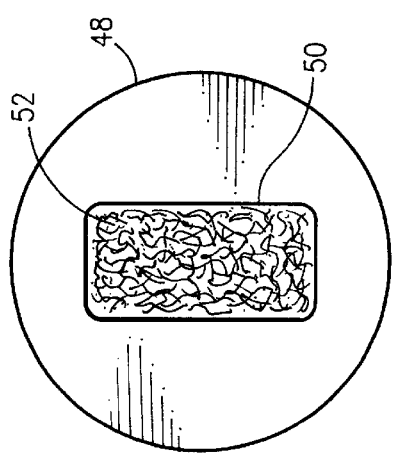
FIG. 4 is an end view of a portion of the torch of FIGS. 1 and 2.
Figure 5:
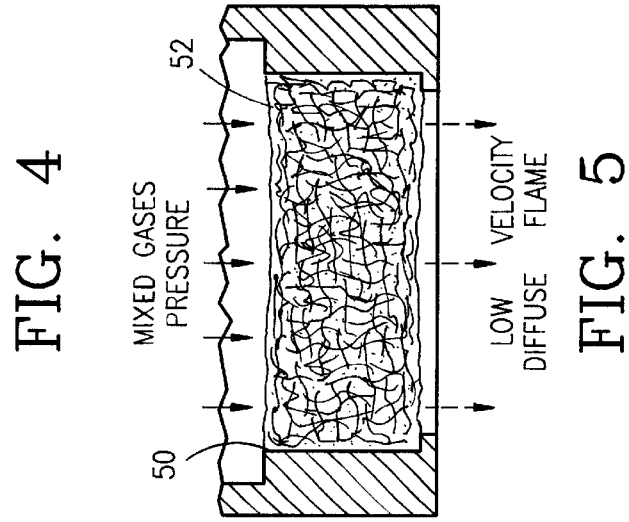
FIG. 5 is an enlarged sectional view of a portion of the flame end of a torch in accordance with the invention showing the nature of gas flows through a diffuser element.

FIG. 13 illustrates several factors influencing the uv exposure and illustrates the evolution of uv absorption $\alpha_2+\alpha_4$ and index change (proportional to $\alpha_{2,final}-\alpha_{2,initial}$) for two couplers of different starting photochemistry. An exposure of an oxidized coupler, starting at A and ending at an exposure level B, shows that the luminescence continues to increase during exposure, the luminescence being proportional to the curve labeled $\alpha_2$. The index of refraction change is proportional to [Ge$^{2+}$, B]–[Ge$^{2+}$, A]. Note that $\alpha_2+\alpha_4$ is proportional to the uv absorption, which starts out very small for oxidized couplers and increases with uv exposure.

FIG. 13 also illustrates another situation in which a more reduced coupler is exposed. An exposure of an oxidized coupler, starting at C and ending at an exposure level corresponding to D, for example, shows that the luminescence starts out at a higher level and continues to increase linearly during exposure. The index of refraction change is proportional to [Ge$^{2+}$, D]–[Ge$^{2+}$, C]. Note that $\alpha_2+\alpha_4$ is proportional to the uv absorption, which is larger for this more reduced coupler. This increase in absorption can lead to undesirable uv heating if the laser intensity is too high, a phenomenon which is more common in reduced couplers.

Figure 14:
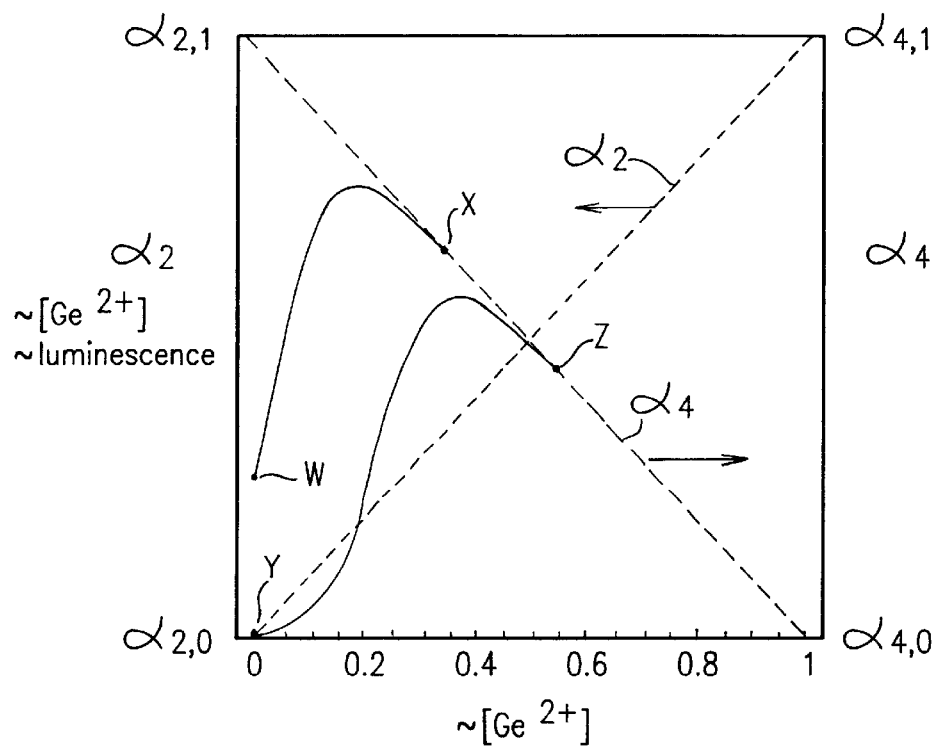
FIG. 14 illustrates the evolution of uv absorption $\alpha_2+\alpha_4$ and index change (proportional to $\alpha_{2,final}-\alpha_{2,initial}$) for two couplers of the same starting photochemistry.

FIG. 14 illustrates the evolution of uv absorption $\alpha_2+\alpha_4$ and index change (proportional to $\alpha_{2,final}-\alpha_{2,initial}$) for two couplers of the same starting photochemistry. An exposure of an oxidized coupler immediately after D$_2$ loading, starting at Y and ending at Z, shows that the initial uv absorption is low. Alternately, if the coupler is allowed to soak in D$_2$ after loading for some extended period of time, the exposure will start at W, a point of higher uv absorption, and end at X. It may be desirable to enhance this uv absorption to more efficiently utilize the uv energy incident of the coupler during the early stage of the exposure.

Figure 15:
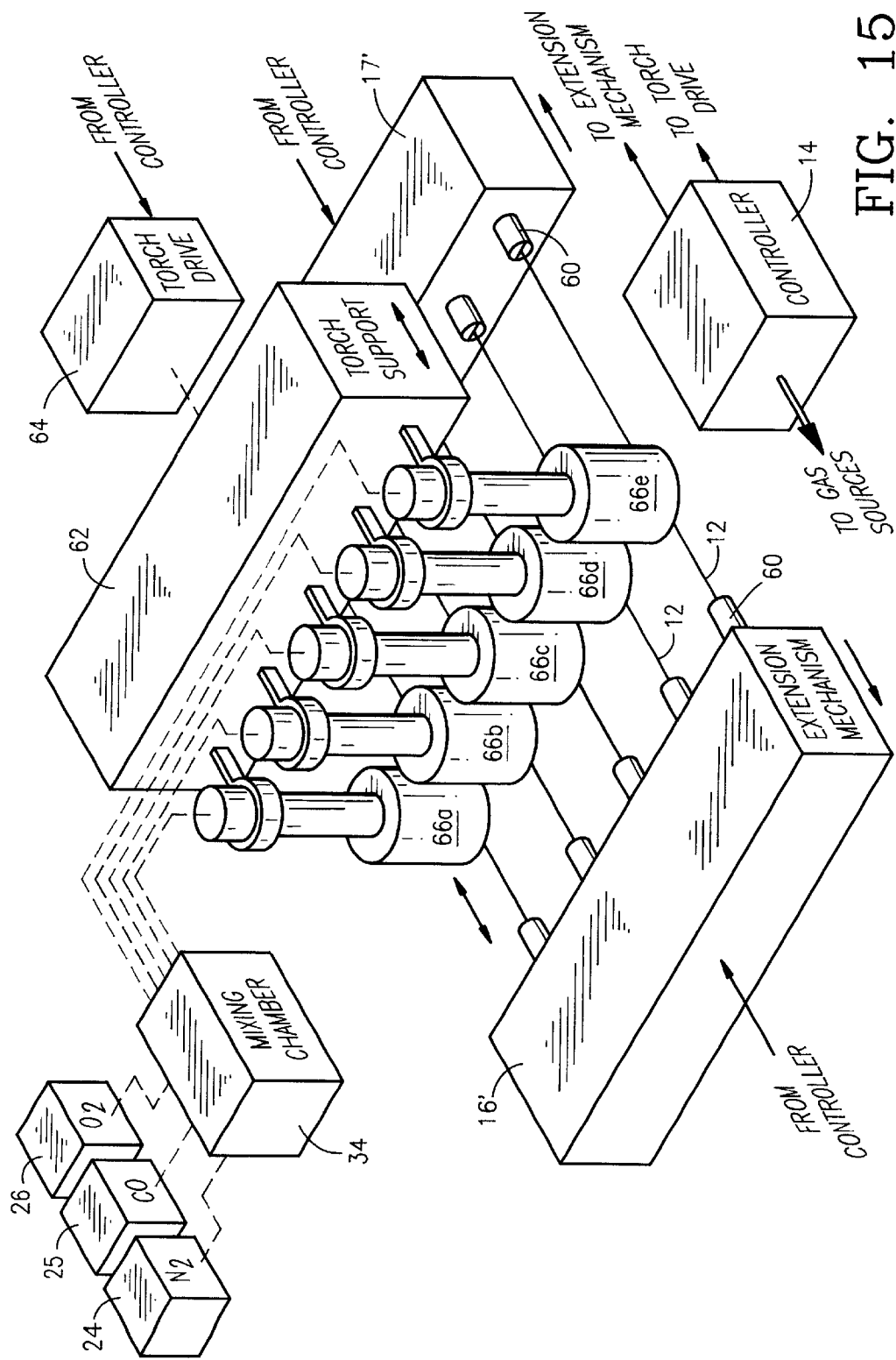
FIG. 15 is a perspective view of a system for forming narrow waist regions in a number of optical fibers continuously.

The stabilized flame and compact torch in accordance with the invention facilitate the deployment of a system for elongating a number of fibers concurrently. As seen in FIG. 15, in which units are numbered in correspondence to FIGS. 1–4 where feasible, fibers 12 are to be stretched between clamps 60 mounted on opposed extension mechanisms 16', 17'. A single torch support 62 is reciprocated along a path parallel to the lengths of the fibers 12 by a torch drive 64 operated in response to control signals from the system controller 14, a number of torches 66a–c respectively are extended from the torch support 62 on individual arms 70, with the outlet orifice (not seen in FIG. 15) for each torch positioned to direct a low velocity flame downwardly onto the target area of the fiber, as previously described. Mixed gases form the chamber 34 are fed through flexible lines to the base portions of the torches 66a–c.

The torches 66a–c are again here of ceramic or like materials and comprise a conduit feeding an end chamber in which the diffuser is mounted, but the conduit alignments are parallel in this configuration to preserve parallelism. The transverse spacings between fibers 12 can be relatively small because of the small size of the individual torches. Alternately, a single linear torch can be utilized which has a long, thin rectangular hot zone which heats all fiber together. The spacings, and the total number of fibers to be processed simultaneously, are selectable at the option of the designer. The multiple-fiber configuration shown in FIG. 15 can achieve a factor of 10 increase in throughput by processing 10 fiber pairs simultaneously. The elongation time to pull 1 coupler is identical to pull 10 couplers; the only difference in process throughput is the additional time to load 10 pairs of fiber rather than 1.

Method of Providing High Performance Gratings

After a photosensitized waveguide device has been fabricated with improved photochemistry as described above, it can be the precursor for grating assisted couplers, add/drop devices and filters of performance characteristics that represent the standard state of the art. High performance add/drop devices and 25 GHz and 50 GHz filters, however, have such strict requirements that the effects of minor anomalies in optical parameters on signal integrity in terms of such factors as chirp (spatial variation in the average index of refraction change) and cross-talk can be unacceptable. Among these parameters are UV wavelength, beam spot size and profile, beam divergence, beam scan velocity, beam intensity, polarization, the exposure characteristics and intensity dependence of the photosensitive material and the type of phase mask (length, apodization, profile, zero order diffraction efficiency).

Maintaining adequately low crosstalk (<–25 dB) demands that the spatial variation of the index of refraction be extremely smooth along the grating length. Specifically, periodicities in the grating of less than 1 mm must be removed to an amplitude level of better than 5% compared to the apodization envelope function. This dictates that the exposure scanning and optics be extremely smooth and often requires the introduction of closed loop feedback based on the uv induced luminescence. In the exposure methods described below, particular care is taken to satisfy these chirp and uniformity requirements.

FIG. 16 represents the range of exposure characteristics for different types of photosensitive waveguide. This curve relates the index of refraction change to the local exposure energy deposited within the waveguide. The first curve is characteristic of a highly reduced material, and the third curve of a highly oxidized material. These behaviors each offer advantages and disadvantages from a grating performance point of view. Typically, the optimized behavior is of the intermediate curve, which is a suitable compromise to obtain stable, saturated, and low crosstalk index of refraction gratings. Note that the photosensitive response evolves as the exposure proceeds, so that the sensitivity depends on the exposure level at any given time in the overall procedure.

Photosensitive glass also exhibits a highly non-linear dependence of uv laser intensity. FIG. 17 represents the photosensitivity, dn/dt ($sec^{-1}$), as a function of laser intensity. Typically, the response includes linear and higher order (e.g. quadratic) dependencies. This response characteristic introduces complexities in the exposure process when recording gratings with apodized phase masks.

The actinic illumination is preferably provided by a laser, and a cw frequency doubled uv laser at 244 nm is a common laser source for recording gratings. The beam is anamorphically shaped (FIG. 18) to make optimal use of the limited laser power (~50 mW) while maintaining low beam divergence. Low beam divergence parallel to the fiber is essential to produce narrow spectral bandwidth gratings, so the beam is enlarged to 700 um to 1000 um and collimated at the exposure plane to produce a beam with less than 0.1 mrad divergence. The beam transverse to the fiber is focused to about 60 um, a dimension which is a compromise between achieving maximum use of the uv power and maintaining a sufficiently large spot to make uniform coverage of the 5–10 um diameter waveguide during scanning possible, despite minute relative variations in position.

The minimization of undesirable spatial variations in the index of refraction is a key to maintaining low crosstalk and chirp in strong index of refraction gratings. A further technique to improve performance is to spatially filter the input uv beam to eliminate structure on the gaussian beam profile, because lasers often exhibit beam characteristics including a series of sidelobes of the type depicted in solid lines in FIG. 19. These sidelobes, if not filtered properly, contribute to an increase in crosstalk. By using a two dimensional spatial filter with cylindrical optics, we remove sidelobes along the x axis and filter out high frequency variations along the transverse, y axis. To prevent new ripple from appearing upon filtering, care is taken that the focal planes of the x and y spatial filters are precisely aligned with the apertures of the spatial filter so as to clip the beam at the intensity minimum. This avoids introduction of undesirable diffraction ripple on the wavefront. Effective spatial filtering also is best achieved with an incident laser beam of high modal purity so that true intensity zeros between the sidelobes are maintained.

Figure 20:
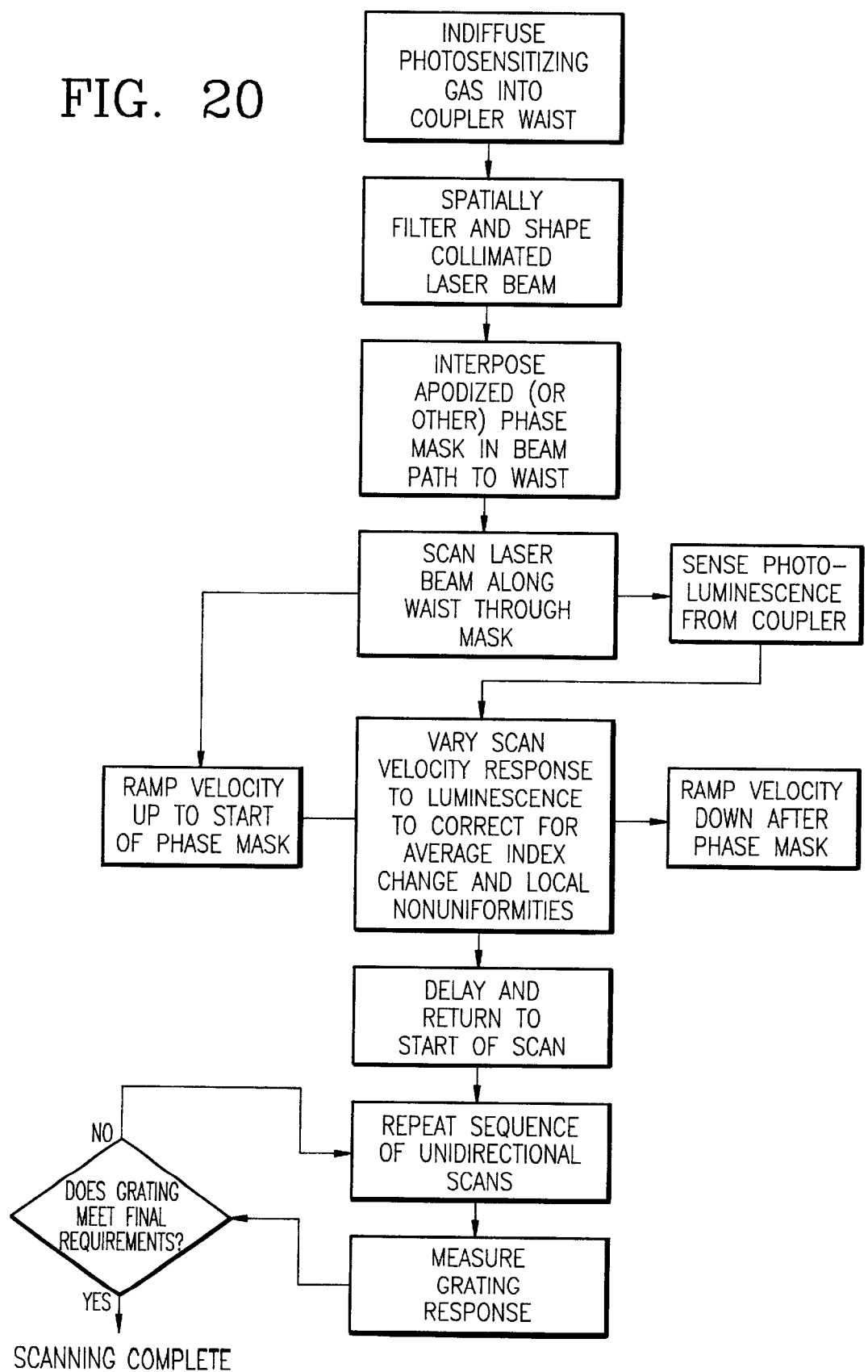
FIG. 20 is a flow sheet showing successive steps in a generalized method in accordance with the invention.

Methods in accordance with the invention for imprinting an index of refraction pattern are shown in general form in FIG. 20. After indiffusion of photosensitizing gas and other procedures discussed above have been effected to achieve the desired photochemistry, the shaped and spatially filtered laser beam scans the target through a chosen photomask. Here the target is, by way of example, the small diameter (0.5–10 $\mu$m) waist of an add/drop coupler in accordance with the Kewitsch et al patent and the photomask is an apodized pattern. During scanning, photoluminescence from the coupler is sensed, and used to control beam exposure during the principal scan length (the photomask length). This is preferably done by velocity modulation, after an initial ramp-up of exposure intensity to smooth the initial transition. Subsequently the exposure is again smoothly ramped down. The scan is repeated by returning to the start point and repeating after a delay which can allow further indiffusion. The strength of the grating is determined by the measuring grating response, and if it does not meet the desired requirement, scanning is repeated until the desired saturation is achieved.

Figure 23:
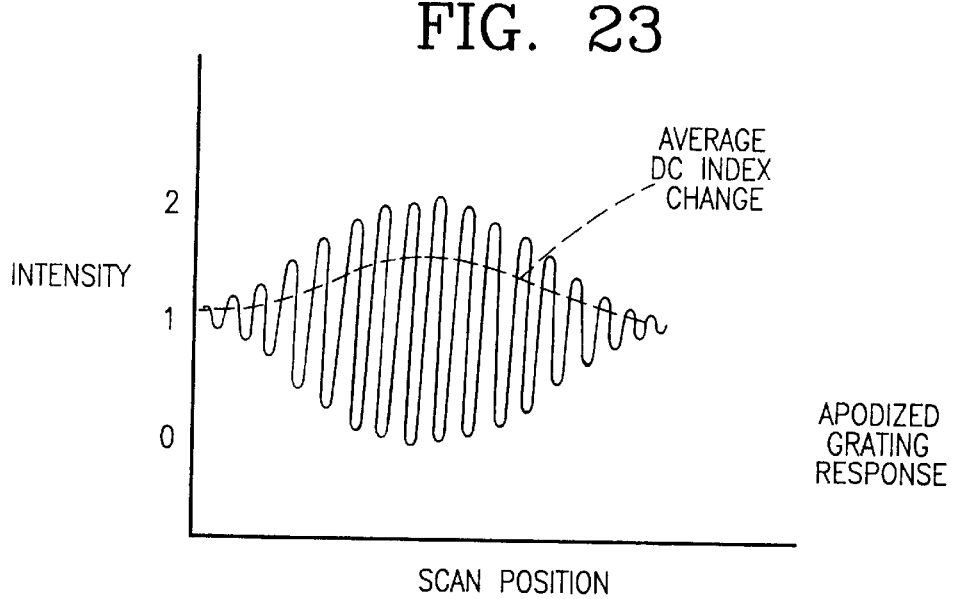
FIG. 23 is a graph depicting average DC index change along the length of an apodized grating during scanning.

FIG. 23 illustrates by the solid line an idealized representation of the intensity profile with position along the coupler behind an apodized phase mask. Note that at the center, where the intensity oscillates between 0 and 2 in normalized units, and at the edges, the intensity is equal to 1. Consider the case in which the intensity response has a linear and an upward quadratic dependence on intensity. The average index change at the center of the phase mask then exceeds the average index change at the edge of the phase mask, and compensating techniques must be implemented to maintain the average index of refraction across the grating as a constant value. The present method effects this compensation.

Figure 21:
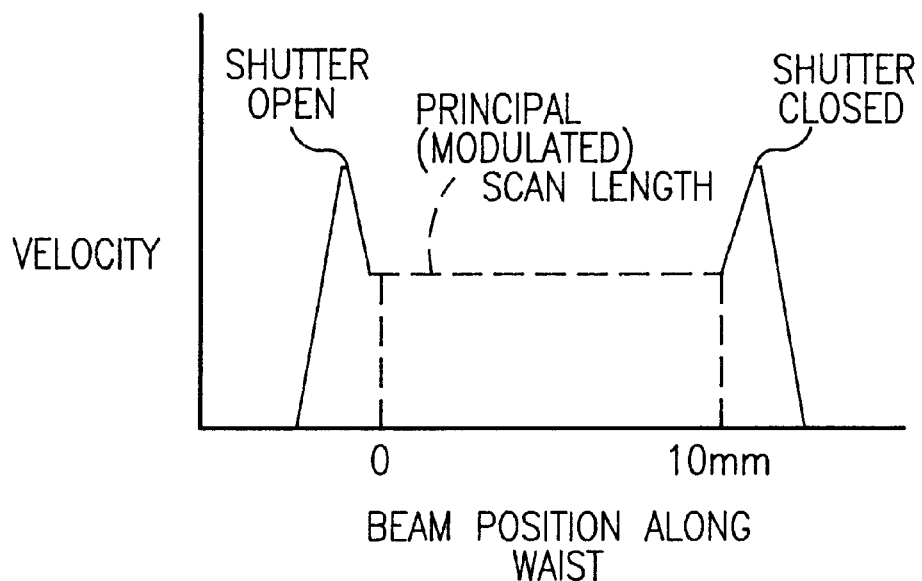
FIG. 21 is a diagrammatic representation of velocity variations vs. beam position during scanning.
Figure 22:
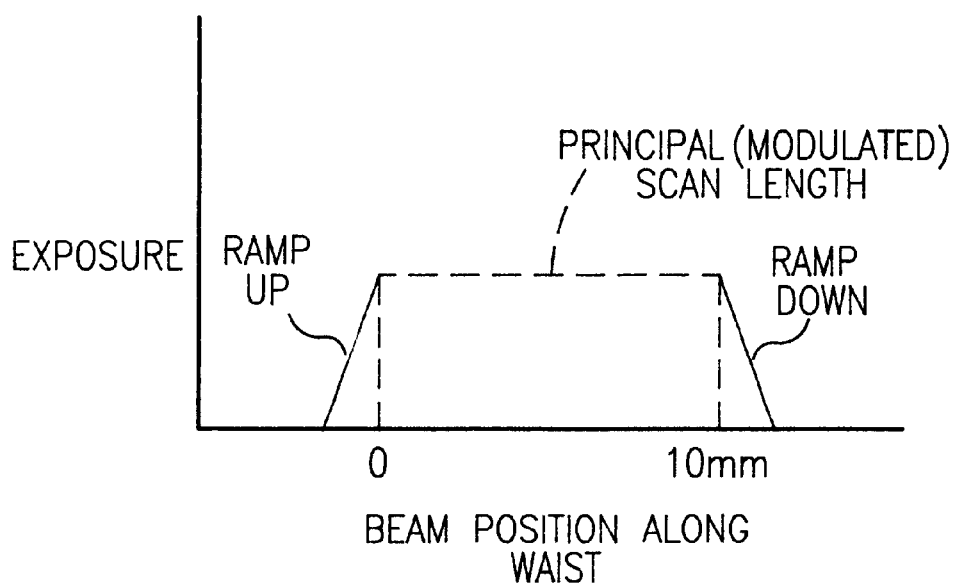
FIG. 22 is a diagrammatic representation of exposure variations vs. beam position for the velocity modulation of FIG. 21.

The desired average, or "dc", index of refraction variation across the fiber is illustrated by the dotted line in FIG. 22 that corresponds to the principal length of the waist region, in which modulation is used. To reduce crosstalk effects (and reduce backreflections in coupler gratings), the exposure is ramped up and down at the edges of the grating. These ramps are typically 0.5 mm in length, and are smoothed by the 0.7 to 1.0 mm extent of the uv beam parallel to the fiber. An effective way of controlling the exposure is to modulate the intensity, or preferably, to modulate the scanning velocity (this later approach does not throw away valuable optical power). To produce this index of refraction change in an ideal, linear recording medium, a scanning velocity profile of the type illustrated in FIG. 21 is utilized. This scan is unidirectional, and requires that the velocity first increase to a maximum, a shutter open to deliver the beam to the photosensitive waveguide, the scan velocity then decrease to increase smoothly the locally deposited exposure energy, after which the scan velocity is modulated relative to a constant reference or nominal value to produce a flat exposure which minimizes chirp, and finally the scan velocity increases back to a maximum value at which point the shutter closes to adiabatically taper off the exposure.

As pointed out earlier, the response of the photosensitive glass is typically nonlinear. This effect, combined with the modulation of the intensity profile impressed by the phase mask, leads to an undesirable increase in the average index of refraction change at the center of the phase mask (FIG. 23). To counteract this effect, the velocity within the apodized phase mask region is contoured in a closed loop manner based on electronic feedback using the detected photoluminescence signal in the 500 to 700 nm wavelength range. This wavelength range is selected because it reduces signal artifacts arising from the relatively strong absorption and changes in absorption arising at shorter wavelengths within the exposed region.

Figure 24:
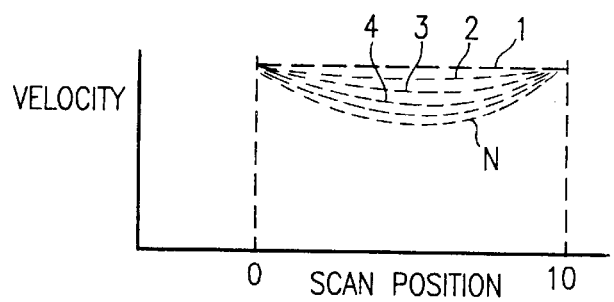
FIG. 24 is a graph of velocity corrections for exposure response during successive scans.

The smooth curves of FIG. 24 illustrate an example of the velocity profiles during a series of exposure scans of the waveguide. The first few passes are performed with uniform exposure. Thereafter, they nominally take the form of quadratic up profiles of increasing depth as the exposure proceeds, and finally saturating after about 10 or more passes. Alternately, Gaussian type profiles may be used; the exact function being highly dependent on the photochemistry of the waveguide and the precise phase mask profile. The reason the initial passes are flat, then evolve to an ever increasing dip, is that the exposure response of FIG. 16, the intermediate curve starts out with a small slope and then increases until a linear growth is achieved. Once linear growth is achieved, the quadratic profiles remain more or less unchanged.

Figure 25:
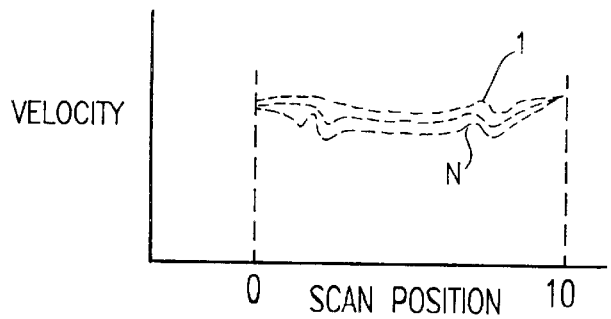
FIG. 25 is a graph of velocity corrections for local non-uniformities during successive scans.

A further refinement to the velocity profiles of FIG. 24 is to correct for local non-uniformities in the transmission of the optical system at the fiber, due to phase mask imperfections, for example. FIG. 25 illustrates an example of such as transmission function. An additional contributor is the non-uniform optical characteristic of the fiber or coupler waist. These non-uniformities, if left uncorrected, would produce excessive crosstalk at adjacent DWDM channels. Therefore, the feedback system which processes the spatial information from the luminescence data is configured to correct the local scan velocity for each pass.

Although a number of modifications and alternatives have been described, it will be appreciated that the invention is not limited thereto but includes all forms and variations within the scope of the appended claims.

What is claimed is:

1. The method of writing a strong grating in an optical fiber comprising the steps of:

preparing a core/cladding fiber with a germanium doped, photosensitive cladding;

heating the fiber during stretching with a moving flame that imparts substantially no OH and oxidizes the fiber to a selected level;

stretching the fiber during heating until a waist region with a vestigial core is formed;

diffusing a photosensitizing gas into the waist region at elevated pressure;

maintaining the diffusion into the waist while writing a grating in the waist with scanning actinic illumination;

balancing the photochemistry by adjusting illumination intensity and scanning velocity to achieve a $[Ge^{2+}]$ fraction of 0.1 or less; and maintaining the illumination until the photo-induced index change reaches a selected level.

2. The method of writing a grating set forth in claim 1 above, wherein the scanning actinic illumination is laser UV illumination and wherein the photochemistry balance is optimized by varying UV laser intensity and exposure scan velocity to achieve a predetermined blue light luminescence variation as a function of the position of the UV illumination along the waist region.

3. The method of writing a grating set forth in claim 2 above, wherein the UV laser intensity is about 2 W/mm$^2$ at 244 nm and the laser scan velocity is about 0.5 mm/sec.

4. The method of writing a grating as set forth in claim 1 above, wherein the local duration of actinic illumination is varied in accordance with the degree of oxidation of the waist after stretching, and wherein the $[Ge^{2+}]$ fraction is ascertained by measuring the value of the luminescence power.

5. The method of writing a grating as set forth in claim 1 above, including the added step of enhancing the index change by maintaining the diffusion of photosensitizing gas for a time before illumination sufficient to increase the initial actinic absorption.

6. The method of writing a strong index of refraction grating in a photosensitive optical material including a photosensitizing dopant, comprising the steps of:

heating the material without neutralizing potential photoreactive sites;

diffusing a photosensitizing gas under elevated pressure and temperature into the material;

concurrently illuminating the material with actinic radiation in the desired grating pattern with an intensity above a selected threshold, and continuing illumination, heating and infusion for a time to arrive at a selected photo-induced index change in the material.

7. The method of writing a strong index of refraction pattern in a photosensitive optical material having a photosensitizing dopant comprising the steps of:

flame heating the material, without introducing any OH content, to oxidize the material to a selected level;

diffusing a photosensitizing gas into the material while concurrently illuminating the material with radiation in the desired index of refraction pattern;

heating the material to a thermal equilibrium level during illumination;

adjusting the illumination to attain a selected photochemistry balance between photon absorptive dopant rates and the trapping of photosensitive gas molecules, and continuing the illumination and heating to arrive at a final photo-induced and thermally induced index change in the material.

8. The method as set forth in claim 7 above, wherein the photosensitizing dopant is Ge, and wherein:

the step of flame heating uses a burning CO gas in an $O_2$ atmosphere;

the step of diffusing comprises diffusing deuterium or hydrogen under pressure into the material;

the illumination is with photons from UV radiation directed at the photosensitive $GeO_2$ unit cells.

* * * * *